United States Patent [19]
McConnell

[11] Patent Number: 5,216,258
[45] Date of Patent: Jun. 1, 1993

[54] OPTICAL DENSITY TRACKING SENSOR FOR ALIGNING MEDIA

[75] Inventor: Scott K. McConnell, Brea, Calif.
[73] Assignee: Calcomp Inc., Anaheim, Calif.
[21] Appl. No.: 848,543
[22] Filed: Mar. 9, 1992
[51] Int. Cl.$^5$ .................................... G01N 21/86
[52] U.S. Cl. ............................. 250/559; 356/434
[58] Field of Search ............... 250/559, 561, 548, 557; 356/433, 434, 237, 429, 239

[56] References Cited

U.S. PATENT DOCUMENTS 4,723,072  2/1988  Naruse ............................. 250/559
5,013,156  3/1991  Murphy ............................ 356/434

*Primary Examiner*—David C. Nelms
*Assistant Examiner*—K. Shami
*Attorney, Agent, or Firm*—Donald A. Streck; Wm. F. Porter, Jr.

[57] ABSTRACT

In a media transporter which positions media, a method and apparatus is provided for positioning the media for accurate alignment. The method includes the steps of sensing a spatial pattern of densities in the media along a scanned strip, saving the spatial pattern of densities during the initial pass to create a path map from the start position to an end point, comparing subsequently sensed spatial patterns of densities to the path map, and following the path map to repeatedly and accurately position the media at any point along the scanned path. The spatial pattern of densities in the media is sensed by shining a light through the media and sensing the transmitted light intensity.

15 Claims, 2 Drawing Sheets

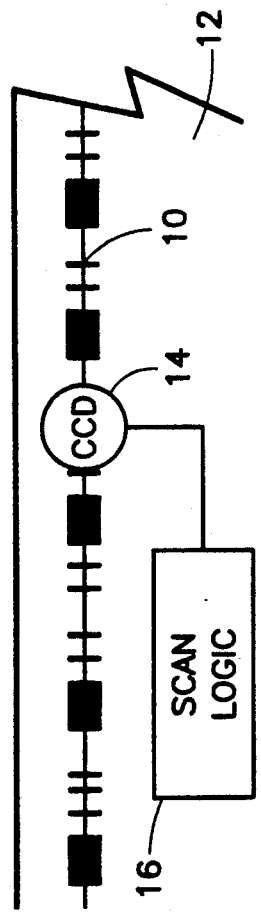
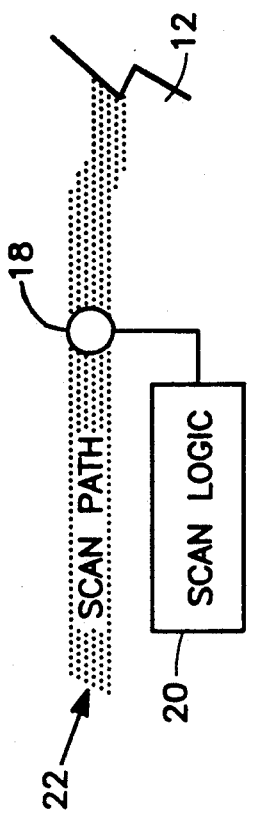
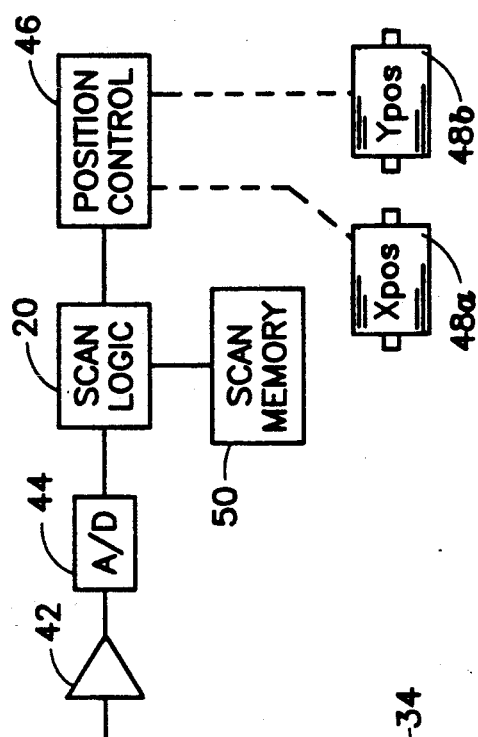
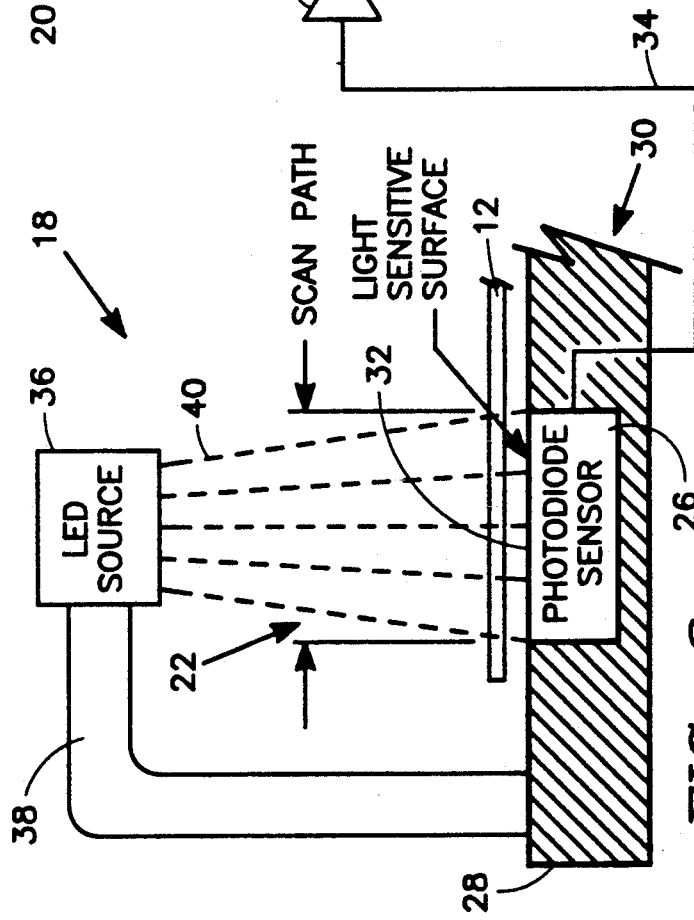

OPTICAL DENSITY TRACKING SENSOR FOR ALIGNING MEDIA

BACKGROUND OF THE INVENTION

This invention relates to a method and apparatus for aligning a media undergoing multiple passes in a media transporter which moves the media to specific desired locations and particularly to the improvement therein including apparatus for sensing a spatial pattern of densities in the media along a scanned strip, apparatus for saving the spatial pattern of densities during an initial pass of the media, and apparatus for comparing the saved spatial pattern of densities with the spatial patterns of densities sensed during subsequent passes, whereby the media can be positioned at desired positions exactly and repeatedly.

Electrostatic, electrophotographic, thermal, and pen printers and plotters of the type which record an image on a strip of recording media moving longitudinally across a transverse linear print head are well-known. Various techniques are known for using light reflected from or transmitted through the media to control such apparatus. For example, U.S. Pat. No. 4,178,095 to Champion et al. discloses employing reflective light-sensing to determine print quality on the media. U.S. Pat. No. 4,275,879 to Yamashita et al. discloses such a technique in connection with sheet feed detector. U.S. Pat. No. 4,670,647 to Hubbel III et al. discloses such a technique in connection with a selfcompensating document sensor which resists false reading in the presence of dust and the like. U.S. Pat. No. 4,468,113 to Motohashi et al. discloses a light transmissive media sensor system for determining paper thickness.

The media generally must be accurately aligned with the tracking sensor prior to operation. Color printers and plotters, particularly of the electrostatic type form color images by superimposing images of different colors on the recording media. Thus, each frame of the media must make multiple passes across the printer head in order to record the multiple images. For this purpose, after the first image is recorded, the direction of media travel across the head is temporarily reversed until the media returns to the starting position for recording of the second image. Then, the second image is recorded on the media as the media is again transported in the forward direction across the printer head. As can be appreciated, the accuracy with which the media is aligned with the printer head during the recording of each image directly affects image quality. If there is a slight error in this alignment, the image is misaligned in proportion to the error. Such misalignment reduces the accuracy of the resulting recorded image. If any misalignment occurs, false colors may also be recorded. Accordingly, each time the media travel direction is reversed and the media is returned to the starting location for the superposition of the next image, the alignment of the media with its original starting position is critical and directly affects image quality. Thus, such alignment presents a significant problem in such printers.

This problem is typically addressed in the prior art in the manner shown in FIG. 1 by the use of a pattern 10 recorded near the edge of the media 12 and a linear multi-pixel image sensor 14 (such as a charge coupled device (CCD)) connected to scan logic 16 which scans reflected light from the pattern 10 as the media 12 moves across the sensor 14 and develops a signal used by control logic of the printer or plotter to position the media 12. Typically, the recorded pattern 10 is a line with a series of rectangles along it. The CCD sensor 14 scans the media 12 and visually "reads" the pattern 10 to determine media position as the media 12 is returned to the starting position for the recording of the next image. The control logic of the printer or plotter processes the signal generated by the CCD sensor 14 to generate an error signal which is used to correct any misalignment of the media with respect to desired positions. The manner in which the signal generated by the CCD sensor 14 is used to correct the alignment of the media 12 with respect to the desired positions is well-known.

One significant problem with this prior art technique is that somehow the pattern must be printed on the media. If the track is pre-printed by the paper manufacturer, the cost of the media to the user increases significantly. If the printer prints the track (for example, during the printing), the cost of using the printer increases significantly. Moreover, the space occupied by the track reduces the amount of space available for recording an image on the media. If nothing else, the time spent printing the pattern is lost time which impacts the printer's overall throughput. Another problem with this prior art technique is that a high-cost linear image sensor (such as the CCD sensor 14) must be employed, which significantly increases the cost of the printer apparatus. Thus, there appears to be no known way of correcting for media position alignment errors in a media transporter without printing a pattern on the media and without installing a multi-pixel image sensor in the printer apparatus.

Accordingly, it is an object of the present invention to accurately correct media alignment errors in a media transporter (such as, for example, a multi-pass color printer) without requiring the printing of any pattern on the media and without requiring the use of a multi-pixel image sensor.

It is a further object of the invention to correct media alignment errors by exploiting only the characteristics of the media itself.

It is another object of the invention to correct media alignment errors by exploiting the spatial patterns of random media density fluctuations inherent in the media.

It is a still further object of the invention to correct media alignment errors by aligning the spatial pattern of random density fluctuations with respect to the media transporter.

It is yet another object of the invention to correct media alignment errors by recognizing spatial patterns of random media density fluctuations.

These and other objects and benefits of the invention will become apparent from the detailed description which follows hereinafter when taken in conjunction with the drawings which accompany it.

SUMMARY OF THE INVENTION

The foregoing objects have been attained in a media transporter translationally moving a media having opposed sides between starting and finishing positions, by the media position alignment system of the present invention for determining the position of media including a light sensor having a light-sensitive surface facing one side of the media, the light sensor producing a signal at an output thereof which is proportional to the intensity of light impinging on the light-sensitive surface, a light source facing the opposite side of the media and directing a beam of light through the media onto the light-sensitive surface, a memory for holding a sequence of signal values, and signal detection and logic apparatus for sampling the output of the light sensor periodically and for sequentially storing values of the output in memory while the media is initially moved between the starting and finishing positions to create a value map of a scanned path between the starting and finishing positions and for sampling the output of the light sensor periodically and for comparing values as sensed to the values in memory while the media is subsequently moved in either direction between the starting and the finishing positions, whereby the media can be positioned at desired positions exactly and repeatedly.

In one embodiment, the light-sensitive surface of the light sensor integrates light passing through a cross section of the media along a scanning path of the media. Additionally, the preferred signal detection and logic includes an operational amplifier connected to the output of the light sensor and an analog-to-digital converter connected to the output of the operational amplifier.

DESCRIPTION OF THE DRAWINGS

FIG. 1 is a simplified drawing depicting the prior art approach to solving the problem solved by the present invention.

FIG. 2 is a simplified drawing depicting the present invention's approach to solving the same problem.

FIG. 3 is a simplified partially cutaway elevation view of the sensing apparatus employed in the present invention.

DETAILED DESCRIPTION OF THE INVENTION

Figure 4:
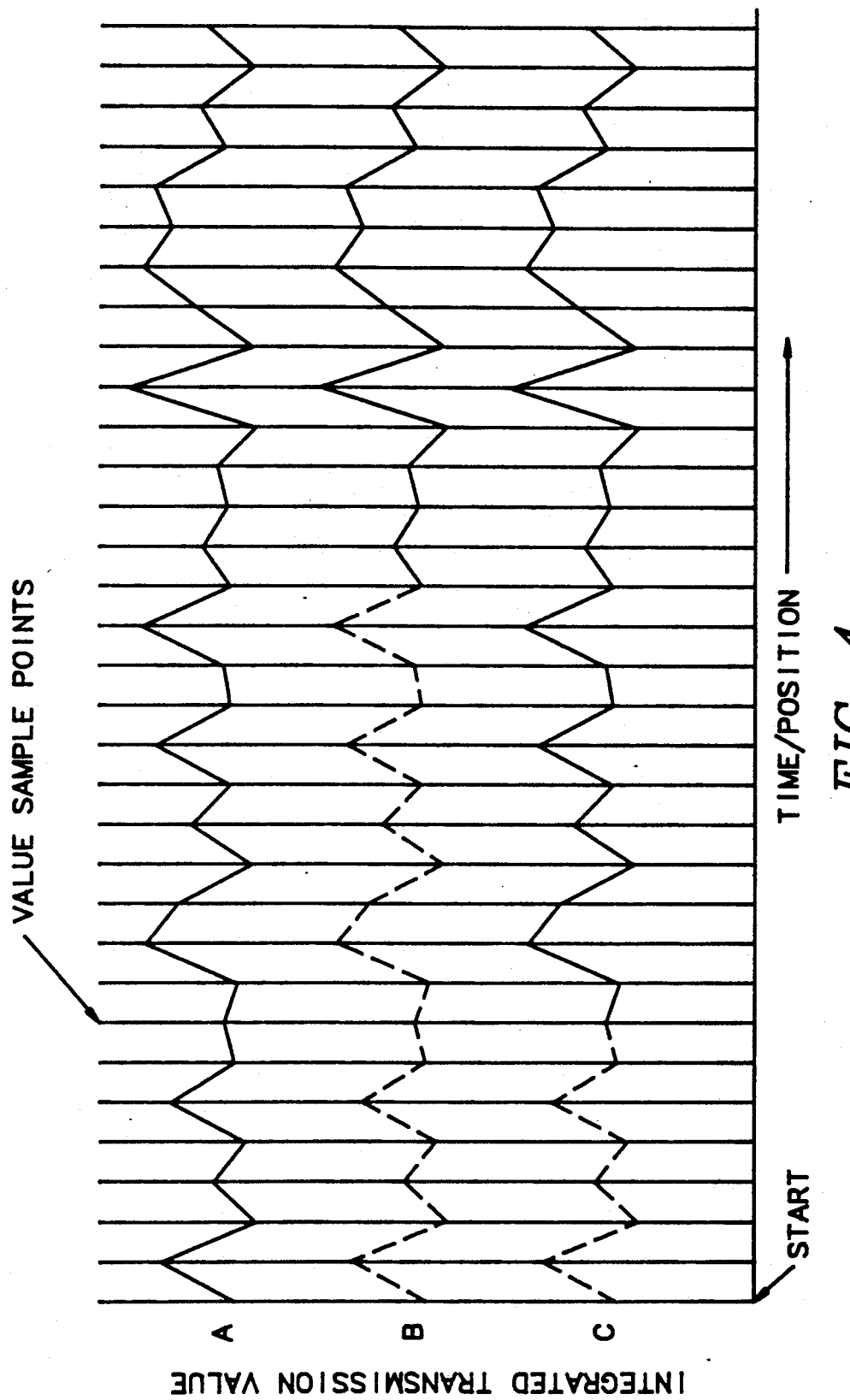
FIG. 4 is a simplified diagram showing sampling values as obtained with the present invention when longitudinally moving media in forward and backward directions.

The present invention is based on sensing the spatial pattern of random media density fluctuations rather than a preprinted pattern. All types of known media have two characteristics which make the present invention not only possible, but practical (as laboratory tests by the inventor has proved). These characteristics are translucency and non-homogeneity. In other words, the media will pass light therethrough and is of an uneven and random density. Thus, as depicted in simplified form in FIG. 2, the present invention operates by having a transmissive light detector 18 attached to scan logic 20 scan a path 22 of the media 12 itself (for example by transporting the media 12 relative to the stationary detector 18).

The preferred apparatus for accomplishing the objects of the present invention is depicted in FIG. 3. The transmissive light detector 18 includes a light sensor 26 disposed in the surface 28 of a printer/plotter 30 over which the media 12 slides in its forward and backward motion along an X axis. The longitudinal motion of the media 12 along the X axis as FIG. 3 is viewed is into and out of the drawing figure. (For embodiments of the invention in which two-dimensional media alignment control is provided, lateral motion of the media 12 along the Y axis as FIG. 3 is viewed is left-to-right.) The light sensor 26 is of a type well known in the art which has a light sensitive surface 32 which causes an electrical output signal to be produced on the output line 34 as a function of the intensity of light impinging on the light sensitive surface 32. This configuration offers many benefits and is, therefore, the preferred embodiment. By being in contact with the media 12, the light sensor 26 is most sensitive to the fluctuations in the density of the media 12 and develops a signal on the output line 34. By having a finite area, the light sensor 26 integrates the density fluctuations of the media 12 for a more accurate representation of the scan path 22. The use of an integrating approach over a finite cross section eliminates the possibility of extraneous signal variations due to microscopic changes in the scanned path as might occur with a smaller sensing area.

The other major component of the transmissive light detector 18 is the light source 36. The light source 36 is held above the light sensor 26 in spaced relationship thereto by the arm 38. The preferred light source 36 includes an LED emitting a beam 40 of light which is directed onto the light sensitive surface 32. Ideally, it is preferred that the beam 40 have uniform intensity across the surface of the light sensor 26.

Since most printers and plotters that would employ the present invention are controlled by digital logic, it is preferred that the output line 34 be connected to an operational amplifier 42 (to amplify the signal from the light sensor 26) and that the output of the operational amplifier 42 be connected to an analog-to-digital converter 44, the output of which is input to the scan logic 20. The scan logic 20 provides an input to the position control logic 46 which controls motor 48a transporting the media 12 in the longitudinal direction. The scan logic 20 is also connected to a memory 50 which saves the "map" of the scan path 22 during movement of the media 12 on its initial pass.

The way the present invention is used to control the media position along the longitudinal direction is best understood with reference to FIG. 4. The graph of FIG. 4 represents magnitude values of the output of the analog-to-digital converter 44 as the media 12 is transported in the longitudinal direction from its initial starting point. The analog-to-digital converter 44, of course, only samples the analog input from the light sensor 26 at discrete intervals as the stationary light sensor 26 scans the path 22 of the moving media 12. Plot "A" represents the values stored in the memory 50 as a map of the scan path 22 during movement of the media 12 on its initial pass. When the media 12 reaches the end of its first pass, it is backed up (i.e. driven in a reverse direction) by the motor 48a under control of the logic 46 in response to inputs from the scan logic 20 until the next starting point is reached. To accomplish this, the scan logic 20 compares the inputs from the analog-to-digital converter 44 to the stored values of the "map" (of plot A). Just as one driving down a highway finds his position by comparing viewed landmarks to a map of the area, the scanned inputs of the return trip provide media density variation landmarks which tell the logic 20 where the media 12 is along its return path. Thus, as depicted in plots "B" and "C", the media is at the position where the solid line ends and the dashed line (representing distance yet to be covered) begins. In one embodiment, the scan logic 20 deduces this distance yet to be covered from the comparison of the output of the analog-to-digital converter 44 with the map of plot A, and outputs a media position error signal. If desired, the scan logic 20 may then compute from the error signal the current position of the media 12. As can be appreciated, the media can be exactly positioned using this approach because of the high degree of accuracy provided by the sampling rate of a typical analog-to-digital converter 44. In an alternative embodiment, the invention provides media positioning control in two dimensions. For this purpose, the position control logic controls not only the X-position motor 48a but also controls a Y-position motor 48b, the two motors 48a, 48b controlling media positioning in the longitudinal and lateral directions, respectively. In this two-dimensional embodiment, the initial scan of the media is a two-dimensional motion rather than along a path, in which the sensor scans not merely a strip of the media but rather a two-dimensional area of the media which may be moved across the sensor during subsequent passes. As a result, the initial or reference map of media density stored in the memory 50 is a two-dimensional map, rather than the one-dimensional map A of FIG. 4. Using this two-dimensional map, the scan logic 20 correlates the sensor output with the two-dimensional map during subsequent motions of the media to monitor the media position in two dimensions and to generate control signals governing the motors 48a, 48b through the position control logic 46 in accordance with received positioning commands.

While the invention has been described as controlling media position with respect to a cartesian coordinate system, other coordinate systems may be employed. For example, if the media motion is primarily rotational rather than translational, then a polar coordinate system may be employed.

Preferably, the media is a non-homogeneous media such as rag or wood pulp media, for example.

Wherefore, having thus described the invention, what is claimed is:

1. In media handling apparatus which transports a media having opposed sides, a media position monitoring system for determining the position of media, comprising:
   a) a light sensor having a light-sensitive surface facing one side of the media, said light sensor producing a signal at an output thereof which is proportional to the intensity of light impinging on said light-sensitive surface;
   b) a light source facing an opposite side of the media and directing a beam of light through the media onto said light-sensitive surface;
   c) memory means for holding a sequence of signal values; and
   d) signal detection and logic means for sampling said output of said light sensor periodically and for sequentially storing values of said output in said memory means while at least a portion of the media is initially moved across said light-sensitive surface so as to create a map of media density values of said portion of said media and for sampling said output of said light sensor periodically and for performing a comparison of the values as sensed while the media is subsequently moved to said values stored in said memory means.

2. The media position monitoring system of claim 1 wherein said apparatus transports said media along a path whereby said portion of said media initially transported across said light sensor comprises a strip and said values of said output stored in said memory means comprise a one-dimensional map of media density values along said strip.

3. The media position monitoring system of claim 2 wherein said apparatus repeatedly transports said media back and forth along said path between start and stop positions, whereby said signal detection and logic means enable said apparatus to repeatedly return said media to a desired position.

4. The media position monitoring system of claim 1 wherein said portion of said media initially moved across said light sensitive surface comprises a two-dimensional area, whereby said map comprises a two-dimensional pattern of media density values and media position monitoring system determines a two-dimensional media position.

5. The media position monitoring system of claim 1 wherein said light-sensitive surface of said light sensor integrates light passing through a cross section of the media along a scanning path.

6. The media position monitoring system of claim 1 wherein said signal detection and logic means includes an operational amplifier connected to said output of said light sensor and an analog-to-digital converter connected to an output of said operational amplifier.

7. In media handling apparatus which includes a media transporter which provides motion of said media relative to said apparatus, the improvement comprising:
   a) means for sensing a spatial pattern of densities in said media as it is transported across said means for sensing;
   b) means for saving an initial spatial pattern of densities sensed by said means for sensing during an initial transporting of at least a portion of said media across said means for sensing;
   c) means for comparing said initial spatial pattern of densities with subsequent spatial patterns of densities sensed by said means for sensing during subsequent transporting of said media.

8. The improvement of claim 7 wherein said means for comparing generates from the comparison of said initial and subsequent spatial patterns of densities a signal representative of the position of said media.

9. The improvement of claim 7 wherein said means for sensing a spatial pattern of densities in the media comprises:
   a) a light sensor having a light-sensitive surface facing one side of the media, said light sensor producing a signal at an output thereof which is proportional to the intensity of light impinging on said light-sensitive surface; and,
   b) a light source facing the opposite side of the media and directing a beam of light through the media onto said light-sensitive surface.

10. The improvement of claim 7 wherein said media transporter transports said media along a path whereby said portion of said media initially transported across said means for sensing comprises a strip extending along said path.

11. The improvement of claim 10 wherein said light-sensitive surface of said light sensor integrates light passing through a cross section of the media along said strip.

12. The improvement of claim 7 wherein said media transporter transports said media in two directions, said portion of said media of said initial transporting comprises a two-dimensional area and said initial pattern of densities comprises a two-dimensional pattern, whereby said means for comparing monitors a two-dimensional position of said media.

13. The improvement of claim 7 wherein said means for saving said spatial pattern of densities during an initial pass and said means for comparing saved ones of said spatial pattern of densities share an operational amplifier connected to said output of said light sensor and an analog-to-digital converter connected to an output of said operational amplifier.

14. In a media recording apparatus which superimposes successive images on recording media during successive passes of said media through said apparatus, and including a media transporter which returns the recording media to respective start positions prior to said passes of said recording media through said apparatus, a method for accurately positioning said media at each respective start position prior to each one of said passes for accurate alignment of the superimposed images, comprising:

a) sensing a spatial pattern of densities in the recording media along a scanned strip;

b) saving the spatial pattern of densities during the initial pass to create a path map of the recording media between a start position and an end position;

c) comparing saved ones of the spatial pattern of densities to spatial patterns of densities sensed during subsequent passes of the media in either one of forward and reverse directions; and, d) following the path map to repeatedly and accurately position the recording media before each subsequent pass.

15. The method of claim 14 wherein said step of sensing a spatial pattern of densities in the recording media along a scanned strip comprises the steps of:

a) transmitting light through the recording media;

b) sensing the amount of light transmitted through the recording media at a plurality of successive sites along the scanned strip; and c) generating a signal for each of the sites reflecting the amount of light transmitted through the recording media thereat.

* * * * *